United States Patent [19]

Tsakanikas et al.

[11] Patent Number: 5,342,589
[45] Date of Patent: Aug. 30, 1994

[54] PROCESS FOR CONVERTING CHROMIUM DIOXIDE MAGNETIC PIGMENT PARTICLES INTO NONMAGNETIC CHROMIUM (III) OXIDE

[75] Inventors: Peter D. Tsakanikas, Tucson, Ariz.; Joseph M. Osborne, Stillwater, Minn.

[73] Assignee: Minnesota Mining and Manufacturing Company, St. Paul, Minn.

[21] Appl. No.: 948,670

[22] Filed: Sep. 22, 1992

[51] Int. Cl.$^5$ .............................. C01G 37/02
[52] U.S. Cl. ................... 423/53; 252/62.54; 423/DIG. 18; 588/234
[58] Field of Search ......... 423/53, 606, 607, DIG. 18; 588/234; 252/62.54; 210/913

[56] References Cited

U.S. PATENT DOCUMENTS

| | | | |
|---|---|---|---|
| 4,086,319 | 4/1978 | Jones | 423/53 |
| 4,099,949 | 7/1978 | Olds | 65/17 |
| 4,428,852 | 1/1984 | Covington, Jr. et al. | 252/62.56 |
| 4,431,625 | 2/1984 | Marshall et al. | 423/607 |
| 4,441,921 | 4/1984 | Curr et al. | 75/10 |
| 4,594,174 | 6/1986 | Nakayama et al. | 252/62.54 |
| 4,769,293 | 9/1988 | Hosoo et al. | 423/607 |
| 4,839,022 | 6/1989 | Skinner | 423/53 |
| 4,940,486 | 7/1990 | Sommerville et al. | 75/10.19 |

FOREIGN PATENT DOCUMENTS

59-215414 12/1984 Japan .

OTHER PUBLICATIONS

56 Fed. Reg. 7165–7166 (Feb. 21, 1991).
Kirk–Othmer Encyclopedia of Chemical Technology, vol. 6, pp. 82–120 (3rd ed. 1979).
EPA Technical Background Document, Control of Metals and HCl Emissions from Hazardous Waste Incinerators, pp. 62–80 (Aug. 1989).
CrO$_2$ Safety and Handling, E. I. DuPont de Nemours Co. (about 1990).
L. W. Gray et al., Proceedings, 1992 Incineration Conference, Albuquerque, N. Mex., "Molten Salt Oxidation as an Alternative to Incineration", pp. 151–155 (May 11–15, 1992).
J. M. Osborne et al., Proceedings, 1992 Incineration Conference, Albuquerque, N. Mex, "Hazardous Waste Incinerator Stack Emission Risks–An Engineer's Perspective", pp. 237–244 (May 11–15, 1992).
M. Trichon et al., 1992 Incineration Conference, Albuquerque, N. Mex., "Risk Assessment, Metals Emissions and the Clean Air Act Amendments of 1990", pp. 255–259 (May 11–15, 1992).
B. B. Ebbinghaus, 1992 Incineration Conference, Albuquerque, N. Mex., "Analysis of Chromium Volatility in the DWTF Incinerator and in the Molten Salt Processor", pp. 599–604 (May 11–15, 1992).
J. J. Santoleri, 1992 Incineration Conference, Albuquerque, N. Mex., "Metals Emissions From Hazardous Waste Incinerators", pp. 611–618 (May 11–15, 1992).
J. M. Osborne, et al., 1992 Incineration Conference, Albuquerque, N. Mex., "Verification of Continuous Monitoring of Metal Emissions", pp. 619–624 (May 11–15, 1992).
R. G. Rizeq, et al., 1992 Incineration Conference, Albuquerque, N. Mex., "Analysis of Toxic Metals Emissions From Waste Combustion Devices", pp. 625–630 (May 11–15, 1992).
M. Trichon, 1992 Incineration Conference, Albuquerque, N. Mex., "Partitioning of metals in Incinerators and Control of Subsequent Emissions: Key Issues for Research", pp. 803–804 (May 11–15, 1992).
L. R. Waterland, 1992 Incineration Conference, Albuquerque, N. Mex., "Metals Emissions From Incinerators: Current Issues", p. 805, (May 11–15, 1992).

*Primary Examiner*—Wayne Langel
*Assistant Examiner*—Stephen G. Kalinchak
*Attorney, Agent, or Firm*—Gary L. Griswold; Walter N. Kirn; David B. Kagan

[57] ABSTRACT

According to a process for converting chromium dioxide into chromium (III) oxide, a composite comprising chromium dioxide particles dispersed in an organic matrix is provided. In a first heating step, a feed consisting essentially of the composite is heated under conditions sufficient to convert the feed into an admixture comprising chromium oxide and carbon. In a second heating step, the admixture is heated under conditions such that substantially all of the chromium oxide in the admixture is converted into chromium (III) oxide. In preferred embodiments, the composite is a chromium dioxide-based magnetic recording medium.

10 Claims, No Drawings

PROCESS FOR CONVERTING CHROMIUM DIOXIDE MAGNETIC PIGMENT PARTICLES INTO NONMAGNETIC CHROMIUM (III) OXIDE

FIELD OF THE INVENTION

The present invention relates to a process for making chromium (III) oxide, and more specifically to a process for converting chromium dioxide magnetic pigment particles into chromium (III) oxide.

BACKGROUND OF THE INVENTION

Magnetic recording media generally comprise a magnetizable layer coated on at least one side of a nonmagnetizable support. For particulate magnetic recording media, the magnetizable layer comprises a magnetic pigment dispersed in a polymeric binder. The magnetizable layer may also include other ingredients such as lubricants, abrasives, thermal stabilizers, antioxidants, dispersants, wetting agents, antistatic agents, fungicides, bactericides, surfactants, coating aids, and the like.

Some forms of magnetic recording media, e.g., magnetic recording tape, also have a backside coating applied to the other side of the nonmagnetizable support in order to improve the durability, conductivity, and tracking characteristics of the media. The backside coating typically comprises a polymeric binder and other ingredients such as lubricants, abrasives, thermal stabilizers, antioxidants, dispersants, wetting agents, antistatic agents, fungicides, bactericides, surfactants, coating aids, and the like.

Chromium dioxide-based magnetic recording media (hereinafter "$CrO_2$ media") are media in which the magnetic pigment of the magnetizable layer comprises chromium dioxide magnetic particles. Environmental risks associated with chromium dioxide have been a serious roadblock obstructing the commercial success of $CrO_2$ media. In the presence of water, the chromium of chromium dioxide tends to be emitted in both the highly carcinogenic hexavalent state, Cr(VI), and the relatively low toxicity trivalent state, Cr(III). One typical decomposition scheme may be represented by the following reaction:

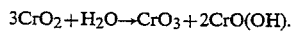

$$3CrO_2 + H_2O \rightarrow CrO_3 + 2CrO(OH).$$

It has been determined that highly toxic Cr(VI) can leach from $CrO_2$ media under testing conditions specified by the United States Environmental Protection Agency ("EPA"). As a result, scrap, used, spent, waste, or by-product $CrO_2$ media are classified as a characteristic hazardous waste by the EPA, and the disposal of $CrO_2$ media is carefully regulated. Disposing of scrap, used, spent, waste, or by-product $CrO_2$ media, therefore, can be expensive, can contaminate the environment, and can expose the owner of the media to potential future liabilities under environmental laws and regulations.

One approach for disposing of $CrO_2$ media involves incinerating the media. During incineration, media containing $CrO_2$ particles is burned at high temperatures along with vast quantities of other waste materials. The result of such incineration is an ash contaminated with a variety of various incinerated materials. Due to its impure nature, the ash is generally useless as a recycled raw material and commonly ends up in a landfill.

The combustion chemistry of chromium oxides such as $CrO_2$ upon incineration is not well understood. Although Cr(VI) could be expected to result from combustion, the EPA has speculated that most of the chromium may be emitted as Cr(III) given that Cr(VI) is so reactive. Even so, the EPA is unable to conclude that Cr(VI) emissions from incineration would always represent less than 10% of total chromium emissions. The EPA assumed at one time that Cr(VI) emissions represent 10% of total chromium emissions upon combustion of chromium oxides. See *EPA Technical Background Document: Controls of Metals and HCl Emissions from Hazardous Waste Incinerators*, page 68 (August 1989). More recently, the EPA has concluded that 100% of chromium emitted from boilers, industrial furnaces, and incinerators is in the hexavalent state. See 56 Fed. Reg. 7165 (Feb. 21, 1991).

U.S. Pat. No. 4,099,949 teaches that chromium (III) oxide is oxidized to $CrO_2$ and $CrO_3$ in the presence of air, but that the higher oxides are reduced back to chromium (III) oxide by metal electrodes in an electric furnace (col. 3, lines 3–17). This reaction mechanism ruins the electrodes (col. 3, lines 18–23). To protect the electrodes, carbon or a carbonaceous material may be used to minimize oxidation or to reduce the higher oxides back to chromium (III) oxide (col. 5, lines 7–15 and 51–52).

Chromium (III) oxide, also known as chromic oxide, chromia, chromium sequioxide, or green cinnabar, has the formula $Cr_2O_3$. Chromium (III) oxide, characterized by a bright green color, has a variety of industrial uses such as green paint pigment, a ceramic, a catalyst in organic synthesis, green granules for roofing shingles, component of refractory brick, and an abrasive. The various chromium oxides, including chromium (III) oxide have been described, for example, in Kirk-Othmer Encyclopedia of Chemical Technology, volume 6, pages 82–120 (3d ed. 1979).

What is needed in the art is a technique for recycling $CrO_2$ media into a recovered useful raw material so that such media do not have to be incinerated and then buried in a landfill.

SUMMARY OF THE INVENTION

It has now been discovered that $CrO_2$ media can be converted into high purity, nonmagnetic chromium (III) oxide by controlled combustion of the media. In the practice of the present invention, chromium (III) oxide can be prepared with extremely low levels of carbon and Cr(VI) impurities. For example, the present invention has provided chromium (III) oxide having less than 5 weight percent, preferably less than 1 weight percent, and more preferably less than 0.2 weight percent carbon impurity. Further, Cr(VI) concentrations of 0.1 weight percent or less (based on the total chromium content of the chromium (III) oxide product) have been achieved by the present invention.

According to the process of the present invention, a composite comprising chromium dioxide particles dispersed in an organic matrix is provided. In a first heating step, a feed consisting essentially of the composite is heated under conditions sufficient to convert the feed into an admixture comprising chromium oxide and carbon. In a second heating step, the admixture is heated under conditions such that substantially all of the chromium oxide in the admixture is converted into chromium (III) oxide. In preferred embodiments, the composite is a chromium dioxide-based magnetic recording medium.

DESCRIPTION OF THE PREFERRED EMBODIMENTS

Composites suitable in the practice of the present invention comprise chromium dioxide magnetic pigment particles dispersed in an organic matrix. Preferably, the organic matrix comprises a polymeric binder. The particular polymeric material useful for providing the polymeric binder is not critical in the practice of the present invention, and a variety of polymeric materials may be used. Examples of suitable polymeric materials include but are not limited to polyurethane, polyester, vinyl chloride copolymer, nitrocellulose, polyimide, styrene-acrylonitrile copolymer, styrene-butadiene copolymer, combinations of such polymers, and the like. The polymeric binder may be crosslinked or uncrosslinked. If cross-linking is desired, then the composite may include a suitable cross-linking agent. As an alternative to the use of a crosslinking agent, a radiation curable polymer may be used and cross-linked with a suitable form of radiation, e.g., electron-beam radiation. The composite may also advantageously include various other additives to facilitate dispersion of the chromium dioxide in the organic matrix. Preferably, the composite comprises no more than 90 weight percent by weight, more preferably no more than 85 weight percent, most preferably no more than about 80 weight percent of chromium dioxide particles based on the total weight of the organic matrix and the chromium dioxide particles.

A particularly preferred composite is a chromium dioxide-based magnetic recording medium ("$CrO_2$ media"). $CrO_2$ media suitable for recycling in the practice of the present invention generally comprise a magnetizable layer deposited onto one major surface of an organic substrate, wherein the magnetizable layer contains chromium dioxide magnetic particles dispersed in a polymeric binder. The organic substrate may be formed from any suitable polymeric or other organic material, but is most commonly a polyester such as polyethylene terephthalate. Optionally, such media may also include a backside coating deposited onto the other major surface of the substrate. Magnetic recording media having backside coatings or magnetizable layers comprising carbon black particles are particularly well suited for use in the practice of the present invention, inasmuch as the carbon black particles provide additional reducing capacity for facilitating the reduction of chromium dioxide to chromium (III) oxide.

As known in the art, the magnetizable layer and the backside coating of $CrO_2$ media may include various minor additives to enhance the performance of the media. Such additives include lubricants, abrasives, thermal stabilizers, antioxidants, dispersants, wetting agents, antistatic agents, fungicides, bactericides, surfactants, coating aids, and the like. Any of the commercially available chromium dioxide-based magnetic recording tapes could be advantageously recycled in the practice of the present invention. To determine the weight percent of chromium dioxide in the composite in those instances wherein the composite is a magnetic recording medium, the organic matrix includes all organic constituents of the magnetic layer, but does not include the organic substrate or any components of the backside coating.

The composite to be recycled is first heated under conditions sufficient to convert the composite into an admixture comprising chromium oxide and carbon. "Chromium oxide" means at least one oxide of chromium, e.g., chromium (III) oxide, chromium dioxide, and/or chromium (VI) oxide. This first heating step occurs in the presence of oxygen, e.g., air. The purpose of this heating step is to drive off volatile organic material from the composite. Heating a composite in accordance with the present invention generally provides an extremely homogeneous admixture of chromium oxide dispersed in a stoichiometric excess of carbon with excellent surface contact between the carbon and the chromium oxide. Advantageously, the admixture of chromium oxide and carbon is formed in situ without requiring the separate process steps of adding carbon to the admixture and/or mechanically mixing the carbon with the chromium oxide. Generally, the carbon that forms in admixture with the chromium oxide is in the form of fixed, elemental amorphous carbon. It is believed that a portion of the chromium dioxide present in the composite may be reduced to chromium (III) oxide during the first heating step.

The duration of the first heating step will vary depending upon a variety of factors such as the heating temperature, reaction pressure, content of oxygen in the reaction zone, the amount of composite that is being heated, the type of heating apparatus used to heat the composite, and the like. Preferably, heating occurs for a time period long enough to provide an admixture of chromium oxide and carbon containing substantially no volatile organic materials. "Volatile organic material" includes all organic constituents of the composite except for carbon. The term "substantially no volatile organic materials" means that the admixture resulting from heating comprises less than 5 weight percent, preferably less than 1 weight percent, and more preferably less than 0.1 weight percent of organic materials other than carbon.

The first heating step may occur at a variety of temperatures. However, if the temperature is too low, then too much organic material may be left in the admixture and/or carbon may not form, thereby adversely affecting the chromium (III) oxide reaction product. On the other hand, if the temperature is too high, then the carbon that forms in the admixture will be driven off too fast before the carbon has a chance to facilitate the reduction of chromium dioxide to chromium (III) oxide. Preferably, the first heating step occurs at a temperature in the range from 450° C. to 820° C., more preferably 590° C. to 760° C.

The composite can be heated to the desired temperature by simply placing the composite in a heating apparatus set at the desired temperature. Alternatively, the composite can be heated to the desired temperature more gradually in a plurality of increments. For example, the composite can be placed in a heating apparatus whose temperature is increased gradually up to the desired temperature.

The first heating step can be accomplished at a variety of pressures. For example, heating can occur in a partial vacuum, at atmospheric pressure, or at elevated pressures, i.e., pressures greater than 1 atmosphere. Preferably, however, heating occurs at atmospheric pressure in air since these conditions are most economical.

In a second heating step, the admixture resulting from the first heating step is further heated under conditions such that substantially all of the chromium oxide in the admixture is converted into chromium (III) oxide. The second heating step can occur at a variety of temperatures. However, if the temperature is too low, then the carbon will not act as a reducing agent to facilitate the reduction of chromium dioxide to chromium (III) oxide. On the other hand, if the temperature is too high, then the reaction could get out of control resulting in the formation of products of incomplete combustion (known in the art as "pics") and/or causing excessively high reaction temperatures to be reached. Generally, the second heating step may occur at a temperature greater than the combustion temperature of carbon but less than the melting point of chromium metal. Preferably, the second heating step occurs at a temperature in the range from 590° C. to 1100° C., more preferably 800° C. to 1100° C. Optionally, the admixture may be cooled, e.g., to room temperature, between the first and second heating steps. Such cooling may be desirable, for example, in order to analyze the chemical content of the admixture or to perform any other desired analysis.

The admixture is maintained at the second heating temperature for a sufficient time such that substantially all of the chromium oxide in the admixture is converted into chromium (III) oxide. The term "substantially all of the chromium in the admixture is reacted to form chromium (III) oxide" means that 95 percent, preferably 99 percent, and more preferably 99.99 percent of the chromium in the reaction product is Cr(III). During such heating, the carbon acts as a reducing agent to facilitate the reduction of the chromium oxide to chromium (III) oxide. The carbon itself is oxidized to form gases such as CO and/or $CO_2$. Advantageously, the second heating step may be carried out until a desired level of carbon impurity remains in the chromium (III) oxide. For example, to prepare chromium (III) oxide having a bright green color, the second heating step can be carried out until little, if any, carbon remains in the product. Alternatively, if a darker colored chromium (III) oxide is desired, the reaction can be carried out for a shorter time period to leave some carbon in the chromium (III) oxide.

The second heating step can be accomplished at a variety of pressures. For example, such heating can occur in a partial vacuum, at atmospheric pressure, or at elevated pressures, i.e., pressures greater than 1 atmosphere. Such heating may also occur in the presence or absence of oxygen. Preferably, however, the second heating step occurs at atmospheric pressure in air since these conditions are most economical. Even when such heating occurs in an oxygen-containing environment, e.g., air, substantially all of the chromium oxide of the admixture is still reduced to chromium (III) oxide. It is believed that this result is attributable to the stoichiometric excess of carbon present in the admixture. We believe that at least a portion of the excess carbon in the admixture reacts with surrounding oxygen to create a reaction environment that is, in effect, oxygen-free. The reaction product of the second heating step is a high purity, green chromium (III) oxide.

In one embodiment of the present invention, the first and second heating steps can occur as two distinct process steps. For example, the first heating step can occur under one set of heating conditions, and the second heating step may then occur under a different set of heating conditions. In another embodiment of the present invention, the first and second heating steps may occur as a single, integral process step. For example, the composite may be heated under a single set of heating conditions at which the composite is first converted into an admixture of carbon and chromium oxide and then converted into green chromium (III) oxide.

The hexavalent chromium content of the chromium (III) oxide may be determined as follows. Hexavalent chromium is extracted by digestion of the chromium (III) oxide with 0.1 N sodium hydroxide at 95° C. The extract is then analyzed colorimetrically by reaction with diphenylcarbazide in acid solution. The optimum concentration range of hexavalent chromium in the extract is 0.1 mg/l to 1 mg/l. Specifically, five different reagents are prepared as follows:

a. a stock hexavalent chromium solution is prepared by dissolving 141.4 mg of potassium dichromate in deionized water and diluting to 2000 ml.
b. a 4 mg/l hexavalent chromium solution is prepared by diluting 8 ml of the stock hexavalent chromium solution to 100 ml with deionized water.
c. 0.1N NaOH is used as an extracting solution.
d. a 1+1 $H_2SO_4$ solution is prepared (i.e., 1 part concentrated $H_2SO_4$ and 1 part deionized water).
e. a diphenylcarbazide solution (DPC) is prepared by dissolving 1.0 g of 1,5-diphenylcarbazide in 200 ml of acetone. 200 ml of deionized water is then added. The DPC solution is stored in a brown bottle at room temperature in the dark. The color of the solution is a very faint, light pink. (The solution may be used until it darkens).

Next, a sample solution for analysis is prepared by weighing 0.50 g of the sample to be tested into a 100 ml beaker. 20 ml of 0.1N NaOH is added. The beaker is covered with a watch glass, and heated for 2 hours at 95° C. (do not boil). After heating, the beaker contents are quantitatively transferred to a 15 ml graduated centrifuge tube. The contents are diluted to 40 ml with deionized water. The sample is then centrifuged for 15 minutes at 3000 rpm. Calibration standards and the sample solution are prepared for color development according to the table below. To make each standard or sample for color development, each component should be added in the order shown horizontally in the table. If the sample solution is colored prior to being prepared for color development, a background aliquot is also prepared.

| Final Cr(VI) Conc. (mg/l) | 4 mg/l Cr(VI) solution | 0.1 N NaOH solution | DPC solution | 1 + 1 $H_2SO_4$ solution | DI $H_2O$ |
|---|---|---|---|---|---|
| 0 | 0 (ml) | 10 (ml) | 1 (ml) | 1 (ml) | 8 (ml) |
| 0.2 | 1 | 10 | 1 | 1 | 7 |
| 0.4 | 2 | 10 | 1 | 1 | 6 |
| 0.6 | 3 | 10 | 1 | 1 | 5 |
| 0.8 | 4 | 10 | 1 | 1 | 4 |
| 1.0 | 5 | 10 | 1 | 1 | 3 |
| Sample | 10 ml* of sample solution | 0 | 1 | 1 | 8 |
| Background | 10 ml* of sample solution | 0 | 0 | 1 | 9 |

*The sample solution is used in place of the 4 mg/l Cr(VI) solution. If the hexavalent chromium concentration is more than 1 mg/l, a suitable dilution with 0.05 N NaOH may be used.

The absorbance at 540 nm after color development of all standards is measured. All standards should be developed for the same amount of time. A calibration curve is constructed by plotting absorbance values for each standard against its concentration. The absorbance at 540 nm of the sample solution may then be measured, being sure the color development time is identical to the time used for the calibration standards. The concentration from the calibration curve may then be determined. If a background sample was prepared, its absorbance is subtracted from the color developed sample solution's absorbance The amount of hexavalent chromium, Cr(VI), is determined from the following chromium, Cr(VI), is determined from the following equation.

mg of hexavalent chromium/kg of solid sample=Absorbance×160.

The present invention will now be further described with reference to the following examples.

EXAMPLE 1

A chromium dioxide magnetic recording tape was divided into 12 parts weighing about 8 g each. Meanwhile, 12 crucibles were prepared by heating each crucible to a temperature above the temperature at which the crucible would be used in the following experiment. Each crucible was heated at its corresponding temperature for 30 minutes and then stored in a desiccator. Each tape sample was placed in a crucible and then each sample was heated in a pre-heated muffle furnace at a temperature in the range from 100° C. to 1000° C. For each sample, the weight percent of the burned off material was determined. The results are shown in the following table:

| Sample | Heating Temperature (°C.) | Weight Percent Burned off |
| --- | --- | --- |
| 1 | 100° C. | 0.16 |
| 2 | 200° C. | 0.37 |
| 3 | 200° C. | 0.36 |
| 4 | 300° C. | 2.44 |
| 5 | 400° C. | 19.44 |
| 6 | 500° C. | 67.64 |
| 7 | 500° C. | 65.27 |
| 8 | 600° C. | 72.72 |
| 9 | 700° C. | 76.79 |
| 10 | 800° C. | 77.17 |
| 11 | 900° C. | 81.31 |
| 12 | 1000° C. | 83.14 |

EXAMPLE 2

Chromium dioxide-based magnetic recording tape was converted into green chromium (III) oxide using a single stage rotary kiln. The rotary kiln was approximately 5 inches in diameter and 4 feet long with an externally heated 18 inch heated section in the middle of its length. The kiln was operated at 710° C. and 1 rpm. Tape was tossed into the kiln and the resulting green chromium (III) oxide was collected at the discharge. The resulting green chromium (III) oxide contained 1.1 weight percent carbon.

EXAMPLE 3

Chromium dioxide-based magnetic recording tape was converted into green chromium (III) oxide using a two-stage rotary kiln. Each rotary kiln had the same dimensions as the rotary kiln of Example 2. The first kiln was operated at 710° C. and 1 rpm and the second kiln was operated at 980° C. and 1 rpm. Tape was tossed into the first kiln, and green chromium (III) oxide was collected from the discharge of the second kiln. The chromium (III) oxide contained 0.15 weight percent carbon and had a Cr(VI) content of 0.29 weight percent.

EXAMPLE 4

The procedure of Example 3 was used, except each kiln was operated at 6 rpm. The resulting chromium (III) oxide contained 0.14 weight percent carbon and had a Cr(VI) content of 0.13 weight percent.

EXAMPLE 5

A chromium oxide-based magnetic recording tape whose magnetizable layer comprised about 85 weight percent magnetic chromium oxide was recycled in accordance with the present invention using a large furnace. Hot combustion gases exited the rear of the oven and were quenched by water sprays and then by flowing through two large, water-filled tanks. After quenching, the cooled gases were cleaned by a baghouse prior to discharge into the atmosphere.

The magnetic recording tape was bundled into six large bales using polymeric straps. Five of the bales weighed 1000 lbs each, and the sixth bale weighed 500 lbs. The following table shows a step by step process used to recycle the tape:

| Step | Time (minutes) | Action |
| --- | --- | --- |
| (1) | 0 | One 1000 lb bale was loaded into the furnace as the temperature of the furnace was set to a temperature of about 1300° F.* |
| (2) | 10 | Raking took place.** |
| (3) | 20 | A second 1000 lb bale was loaded into the furnace. |
| (4) | 30 | Raking took place. |
| (5) | 40 | A third 1000 lb bale was loaded into the furnace. |
| (6) | 50 | The furnace was turned off, but the temperature remained at about 1300° F. as the tape burned. Raking also took place. |
| (7) | 60 | The 500 lb bale was loaded into the furnace. |
| (8) | 70 | Raking took place. |
| (9) | 80 | A fourth 1000 lb bale was loaded into the furnace. |
| (10) | 90 | Raking took place. |
| (11) | 100 | A fifth 1000 lb bale was loaded into the furnace. |
| (12) | 110 | Raking took place. |
| (13) | 120 | The sixth 1000 lb bale was loaded into the furnace. |
| (14) | 130 | Raking took place for 5 minutes at about 10 minute intervals. At the end of 240 minutes, the tape had been converted into an admixture of chromium oxide and carbon. Substantially all of the volatile organic material had been burned away. |
| (15) | 240 | The furnace was set at a temperature of about 1900° F.* |
| (16) | 240 to 480 | Raking took place for 5 minutes at about 10 minute intervals. After 480 minutes, the resulting product was a high purity, green chromium (III) oxide. |

*The temperature set point indicates the temperature of the hot combustion gases above the tape. It is believed that the tape sample was actually 100° C. to 200° C. cooler than these gases.
**Raking means that the tape was physically raked to expose more of the surface of the tape to the air.

After processing more than 50,000 lbs of tape, the quench water was nondefect for Cr(VI), indicating that very little if any Cr(VI) was being emitted from the furnace.

EXAMPLE 6

Chromium dioxide-based magnetic recording tape was processed in accordance with Example 5, except the following steps were carried out:

| Step | Time (minutes) | Action |
|---|---|---|
| (1) | 0 | One 1000 lb bale was loaded into the furnace as the furnace was set at 1500° F. The tape was raked for 5 minutes at 10 minute intervals for the next 50 minutes. |
| (2) | 50 | A second 1000 lb bale was loaded into the furnace. The tape was raked for 5 minutes at 10 minute intervals for the next 50 minutes. |
| (3) | 100 | Step (2) was repeated. |
| (4) | 150 | Step (2) was repeated. |
| (5) | 200 | Step (2) was repeated. |
| (6) | 250 | A last 1000 lb bale was loaded into the furnace. |
| (7) | 255 | The furnace was set at 1900° F. Raking took place for 10 minutes at 5 minute intervals until 480 minutes had passed. |
| (8) | 480 | The furnace was turned off. The green chrome (III) product was left in the furnace overnight with the furnace door closed. The chromium (III) oxide was removed the next morning. |

EXAMPLE 7

Chromium dioxide-based magnetic recording tape was processed in accordance with a procedure similar to Example 5 or 6. Thereafter, a portion of the resulting product was treated in a rotary kiln of the type described in Example 2. The rotary kiln was operated at 910° C. and 1 rpm.

Other embodiments of this invention will be apparent to those skilled in the art from a consideration of this specification or from practice of the invention disclosed herein. Various omissions, modifications, and changes to the principles described herein may be made by one skilled in the art without departing from the true scope and spirit of the invention which is indicated by the following claims.

What is claimed is:

1. A process for converting chromium dioxide magnetic particles into chromium (III) oxide, comprising the steps of:

a) providing a chromium dioxide-based magnetic recording medium comprising chromium dioxide magnetic particles dispersed in an organic matrix;

b) in a first heating step, heating a feed consisting essentially of said chromium dioxide-based magnetic recording medium, wherein said first heating step occurs in the presence of oxygen under conditions sufficient to convert the medium into an admixture comprising chromium oxide and carbon; and c) in a second heating step, heating the admixture under conditions such that substantially all of the chromium oxide in the admixture is converted into green chromium (III) oxide which is then recovered.

2. The process of claim 1, wherein said magnetic recording medium further comprises a backside coating provided on the other side of the organic substrate, wherein the backside coating comprises carbon black particles dispersed in a polymeric binder.

3. The process of claim 1, wherein the organic matrix comprises a polymeric binder.

4. The process of claim 1, wherein the first heating step occurs under conditions such that said admixture comprises substantially no volatile organic materials.

5. The process of claim 1, wherein the first heating step occurs in air at atmospheric pressure and at a temperature in the range from about 450° C. to about 760°0 C.

6. The process of claim 1, wherein the first heating step occurs in air at atmospheric pressure and at a temperature in the range from about 590° C. to about 760° C.

7. The process of claim 1, wherein the second heating step occurs in air at atmospheric pressure and at a temperature in the range from about 590° C. to about 1100° C.

8. The process of claim 1, wherein the second heating step occurs in air at atmospheric pressure and at a temperature in the range from about 450° C. to about 760° C.

9. The process of claim 1, wherein the second heating step occurs in air at atmospheric pressure and at a temperature greater than the combustion temperature of carbon but less than the melting point of chromium (III) oxide.

10. The process of claim 1, wherein the first and second heating steps occur in air at atmospheric pressure and wherein both heating steps occur at about the same temperature, said temperature being in the range from about 600° C. to about 1100° C.

* * * * *

UNITED STATES PATENT AND TRADEMARK OFFICE
CERTIFICATE OF CORRECTION

PATENT NO. : 5,342,589
DATED : August 30, 1994
INVENTOR(S) : Tsakanikas et al.

It is certified that error appears in the above-indentified patent and that said Letters Patent is hereby corrected as shown below:

Col. 10, line 28, "760°0" should be --760°--.

Col. 10, line 40, "450°C. to about 760°C." should be --800°C to about 1100°C.--.

Signed and Sealed this

Thirty-first Day of January, 1995

Attest:

BRUCE LEHMAN

Attesting Officer           Commissioner of Patents and Trademarks